(12) United States Patent  
Wigard et al.

(10) Patent No.: US 11,974,242 B2
(45) Date of Patent: Apr. 30, 2024

(54) NEIGHBOUR CELL MEASURING

(71) Applicant: NOKIA TECHNOLOGIES OY, Espoo (FI)

(72) Inventors: Jeroen Wigard, Klarup (DK); Frank Frederiksen, Klarup (DK); Mads Lauridsen, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 21 days.

(21) Appl. No.: 17/445,592

(22) Filed: Aug. 20, 2021

(65) Prior Publication Data

US 2022/0061004 A1 Feb. 24, 2022

(30) Foreign Application Priority Data

Aug. 21, 2020 (FI) ...................................... 20205813

(51) Int. Cl.
*H04B 7/155* (2006.01)
*H04B 7/185* (2006.01)
(Continued)

(52) U.S. Cl.
CPC .......... *H04W 56/001* (2013.01); *H04B 7/155* (2013.01); *H04B 7/1851* (2013.01);
(Continued)

(58) Field of Classification Search
CPC . H04B 7/02–2696; H04B 17/0082–409; H04J 11/0023–0093; H04J 2011/0003–0096; H04L 5/0001–26; H04L 7/0004–10; H04W 8/22–245; H04W 16/02–32; H04W 24/02–10; H04W 28/02–26; H04W 36/0005–385; H04W 48/02–20; H04W 56/0005–0095;
(Continued)

(56) References Cited

U.S. PATENT DOCUMENTS 8,676,213 B2   3/2014  Laitinen et al.
10,305,644 B2  5/2019  Hahn et al.
(Continued)

FOREIGN PATENT DOCUMENTS

WO   2020067973 A1   4/2020
WO   2020083120 A1   4/2020
(Continued)

OTHER PUBLICATIONS

European Search Report for Application No. 21192057.4, completed Jan. 25, 2022, 11 pages.
(Continued)

*Primary Examiner* — Timothy J Weidner
(74) *Attorney, Agent, or Firm* — Brake Hughes Bellermann LLP

(57) ABSTRACT

Disclosed is a method comprising determining a first time period during which radio mobility of one or more terminal devices is not expected, determining a second time period during which radio mobility of the one or more terminal devices is expected, determining a first synchronization signal block, SSB, transmission mode that is to be applied during the first time period, and determining a second synchronization signal block, SSB, transmission mode that is to be applied during the second time period.

18 Claims, 8 Drawing Sheets

(51) Int. Cl.
*H04B 17/20* (2015.01)
*H04B 17/40* (2015.01)
*H04W 24/08* (2009.01)
*H04W 24/10* (2009.01)
*H04W 36/00* (2009.01)
*H04W 36/08* (2009.01)
*H04W 36/32* (2009.01)
*H04W 56/00* (2009.01)
*H04W 72/044* (2023.01)
*H04W 72/0446* (2023.01)
*H04W 84/04* (2009.01)
*H04W 84/06* (2009.01)
*H04W 88/02* (2009.01)
*H04W 88/08* (2009.01)
*H04W 92/02* (2009.01)
*H04W 92/10* (2009.01)
*H04W 92/20* (2009.01)

(52) U.S. Cl.
CPC ........... *H04B 17/254* (2023.05); *H04B 17/40* (2015.01); *H04W 24/08* (2013.01); *H04W 24/10* (2013.01); *H04W 36/0061* (2013.01); *H04W 36/0088* (2013.01); *H04W 36/085* (2023.05); *H04W 36/324* (2023.05); *H04W 56/0015* (2013.01); *H04W 72/0446* (2013.01); *H04W 72/046* (2013.01); *H04W 84/042* (2013.01); *H04W 84/06* (2013.01); *H04W 88/02* (2013.01); *H04W 88/08* (2013.01); *H04W 92/02* (2013.01); *H04W 92/10* (2013.01); *H04W 92/20* (2013.01)

(58) Field of Classification Search
CPC ......... H04W 72/02–569; H04W 74/002–0891; H04W 84/005–22; H04W 88/005–188; H04W 92/02–24
See application file for complete search history.

(56) References Cited

U.S. PATENT DOCUMENTS

2017/0359714 A1 12/2017 Gupta et al.
2018/0302819 A1 10/2018 Lee et al.
2020/0205102 A1* 6/2020 Islam ................... H04W 56/001
2020/0413309 A1* 12/2020 Zhu ..................... H04W 56/001
2021/0058917 A1* 2/2021 Abedini ............... H04W 56/001

FOREIGN PATENT DOCUMENTS

WO WO-2020067973 A1 * 4/2020 .......... H04W 56/001
WO 2020089388 A1 5/2020
WO 2020163610 A1 8/2020

OTHER PUBLICATIONS

Office Action for Finland Patent Application No. 20205813, dated Nov. 24, 2000, 8 pages.
3GPP TSG-RAM WG1 #96; R1-1902410; "SSB-Based IAB Node Discovery and Measurement"; Agenda Item: 7.2.3.2; Source: Ericsson; Feb. 25-Mar. 1, 2019; 9 pages.
Office Action for European Patent Application No. 21192057.4, mailed on Feb. 1, 2024, 4 pages.

* cited by examiner

NEIGHBOUR CELL MEASURING

CROSS-REFERENCE TO RELATED APPLICATIONS

This application claims priority to Finnish patent application No. 20205813, filed Aug. 21, 2020, entitled "IMPROVED NEIGHBOUR CELL MEASURING" which is hereby incorporated by reference in its entirety

FIELD

The following exemplary embodiments relate to wireless communication and performing neighbour cell measurements when movement of a terminal device and/or an access node is predictable.

BACKGROUND

Wireless communication allows devices to freely move from one area to another. Additionally, it may be possible for an access node to move as well. For example, a non-terrestrial network may comprise a satellite that orbits around the Earth. In such cases the mobility and neighbour cell measurements associated with it are still to be reliable and obtainable.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising means for: determining a first time period during which radio mobility of one or more terminal devices is not expected, determining a second time period during which radio mobility of the one or more terminal devices is expected, determining a first synchronization signal block, SSB, transmission mode that is to be applied during the first time period, and determining a second synchronization signal block, SSB, transmission mode that is to be applied during the second time period.

According to a second aspect there is provided an apparatus comprising at least one processor, and at least one memory including a computer program code, wherein the at least one memory and the computer program code are configured, with the at least one processor, to cause the apparatus to: determine a first time period during which radio mobility of one or more terminal devices is not expected, determine a second time period during which radio mobility of the one or more terminal devices is expected, determine a first synchronization signal block, SSB, transmission mode that is to be applied during the first time period, and determine a second synchronization signal block, SSB, transmission mode that is to be applied during the second time period.

In some exemplary embodiments, the first SSB transmission mode comprises a first SSB transmission periodicity and the second SSB transmission mode comprises a second SSB transmission periodicity, wherein the second SSB transmission occurs more frequently than the first SSB transmission.

In some exemplary embodiments, changing from the second periodicity to the first periodicity comprises decreasing the frequency of the second SSB transmission gradually to the frequency of the first SSB.

In some exemplary embodiments, the first SSB transmission mode comprises using a first amount of 5G beams and the second SSB transmission mode comprises using a second amount of 5G beams and wherein the second amount is greater than the first amount.

In some exemplary embodiments, determining the second time period comprises determining occurrence of a cell switch state for at least two Earth-fixed cells.

In some exemplary embodiments, the apparatus is further caused to provide an indication to an access node providing the serving cell for the one or more terminal devices, wherein the indication indicates when the second time period occurs.

In some exemplary embodiments, the apparatus is comprised in a gNB.

In some exemplary embodiments, the gNB is comprised, at least partly, on a satellite or the gNB is on the ground with radio signals travelling through the satellite.

In some exemplary embodiments, the gNB provides an Earth-fixed cell.

According to a third aspect there is provided an apparatus comprising means for: receiving an indication from an access node, which provides a serving cell to the apparatus, regarding a first time period and a second time period, determining, based on the indication, that in a neighbour cell a first synchronization signal block, SSB, transmission mode is used during the first time period and a second synchronization signal block, SSB, transmission mode is used during the second time period and determining that during the second time period neighbour cell measurement is to be performed and transmitted to the access node.

According to a fourth aspect there is provided an apparatus comprising at least one processor, and at least one memory including a computer program code, wherein the at least one memory and the computer program code are configured, with the at least one processor, to cause the apparatus to: receive an indication from an access node, which provides a serving cell to the apparatus, regarding a first time period and a second time period, determine, based on the indication, that in a neighbour cell a first synchronization signal block, SSB, transmission mode is used during the first time period and a second synchronization signal block, SSB, transmission mode is used during the second time period and determine that during the second time period neighbour cell measurement is to be performed and transmitted to the access node.

In some exemplary embodiments the neighbour cell measurement is to be performed based on SSB transmitted by another access node that provides the target cell.

In some exemplary embodiments the apparatus is further caused to determine that during the first time period neighbour cell measurements are not to be performed.

In some exemplary embodiments the apparatus is further caused to perform radio mobility to the neighbour cell during the second time period.

In some exemplary embodiments the apparatus is comprised in a terminal device.

According to a fifth aspect there is provided a system comprising a first gNB, wherein the radio signalling of the first gNB is transmitted via a first satellite, a second gNB, wherein radio signalling of the second gNB is transmitted via a second satellite, wherein the first gNB provides a first cell that is a first Earth-fixed cell and the second gNB provides a second cell that is a second Earth-fixed cell, and one or more terminal devices that are served by the first cell, wherein the second gNB is caused to: determine a first time period during which radio mobility, that is from the first cell to the second cell, of the one or more terminal devices is not expected, determine a second time period during which radio mobility of the one or more terminal devices from the first cell to the second cell is expected, determine a first synchronization signal block, SSB, transmission mode that is to be applied during the first time period, determine a second synchronization signal block, SSB, transmission mode that is to be applied during the second time period, and provide an indication to the first gNB indicating the occurrence of at least the second time period, and wherein the first gNB is caused to further provide the indication to the one or more terminal devices.

According to a sixth aspect there is provided a method comprising determining a first time period during which radio mobility of one or more terminal devices is not expected, determining a second time period during which radio mobility of the one or more terminal devices is expected, determining a first synchronization signal block, SSB, transmission mode that is to be applied during the first time period, and determining a second synchronization signal block, SSB, transmission mode that is to be applied during the second time period.

According to a seventh aspect there is provided a method comprising receiving an indication from an access node, which provides a serving cell to the apparatus, regarding a first time period and a second time period, determining, based on the indication, that in a neighbour cell a first synchronization signal block, SSB, transmission mode is used during the first time period and a second synchronization signal block, SSB, transmission mode is used during the second time period and determining that during the second time period neighbour cell measurement is to be performed and transmitted to the access node.

According to an eighth aspect there is provided a computer program product readable by a computer and, when executed by the computer, configured to cause the computer to execute a computer process comprising determining a first time period during which radio mobility of one or more terminal devices is not expected, determining a second time period during which radio mobility of the one or more terminal devices is expected, determining a first synchronization signal block, SSB, transmission mode that is to be applied during the first time period, and determining a second synchronization signal block, SSB, transmission mode that is to be applied during the second time period.

According to a ninth aspect there is provided a computer program product readable by a computer and, when executed by the computer, configured to cause the computer to execute a computer process comprising receiving an indication from an access node, which provides a serving cell to the apparatus, regarding a first time period and a second time period, determining, based on the indication, that in a neighbour cell a first synchronization signal block, SSB, transmission mode is used during the first time period and a second synchronization signal block, SSB, transmission mode is used during the second time period and determining that during the second time period neighbour cell measurement is to be performed and transmitted to the access node.

According to a tenth aspect there is provided a computer program comprising instructions for causing an apparatus to perform at least the following: determine a first time period during which radio mobility of one or more terminal devices is not expected, determine a second time period during which radio mobility of the one or more terminal devices is expected, determine a first synchronization signal block, SSB, transmission mode that is to be applied during the first time period, and determine a second synchronization signal block, SSB, transmission mode that is to be applied during the second time period.

According to an eleventh aspect there is provided a computer program comprising instructions for causing an apparatus to perform at least the following: receive an indication from an access node, which provides a serving cell to the apparatus, regarding a first time period and a second time period, determine, based on the indication, that in a neighbour cell a first synchronization signal block, SSB, transmission mode is used during the first time period and a second synchronization signal block, SSB, transmission mode is used during the second time period and determine that during the second time period neighbour cell measurement is to be performed and transmitted to the access node.

According to a twelfth aspect there is provided a non-transitory computer readable medium comprising program instructions for causing an apparatus to perform at least the following: determine a first time period during which radio mobility of one or more terminal devices is not expected, determine a second time period during which radio mobility of the one or more terminal devices is expected, determine a first synchronization signal block, SSB, transmission mode that is to be applied during the first time period, and determine a second synchronization signal block, SSB, transmission mode that is to be applied during the second time period.

According to a thirteenth aspect there is provided a non-transitory computer readable medium comprising program instructions for causing an apparatus to perform at least the following: receive an indication from an access node, which provides a serving cell to the apparatus, regarding a first time period and a second time period, determine, based on the indication, that in a neighbour cell a first synchronization signal block, SSB, transmission mode is used during the first time period and a second synchronization signal block, SSB, transmission mode is used during the second time period and determine that during the second time period neighbour cell measurement is to be performed and transmitted to the access node.

LIST OF DRAWINGS

In the following, the invention will be described in greater detail with reference to the embodiments and the accompanying drawings, in which FIG. 1 illustrates an exemplary embodiment of a radio access network;

DESCRIPTION OF EMBODIMENTS

Figure 1:
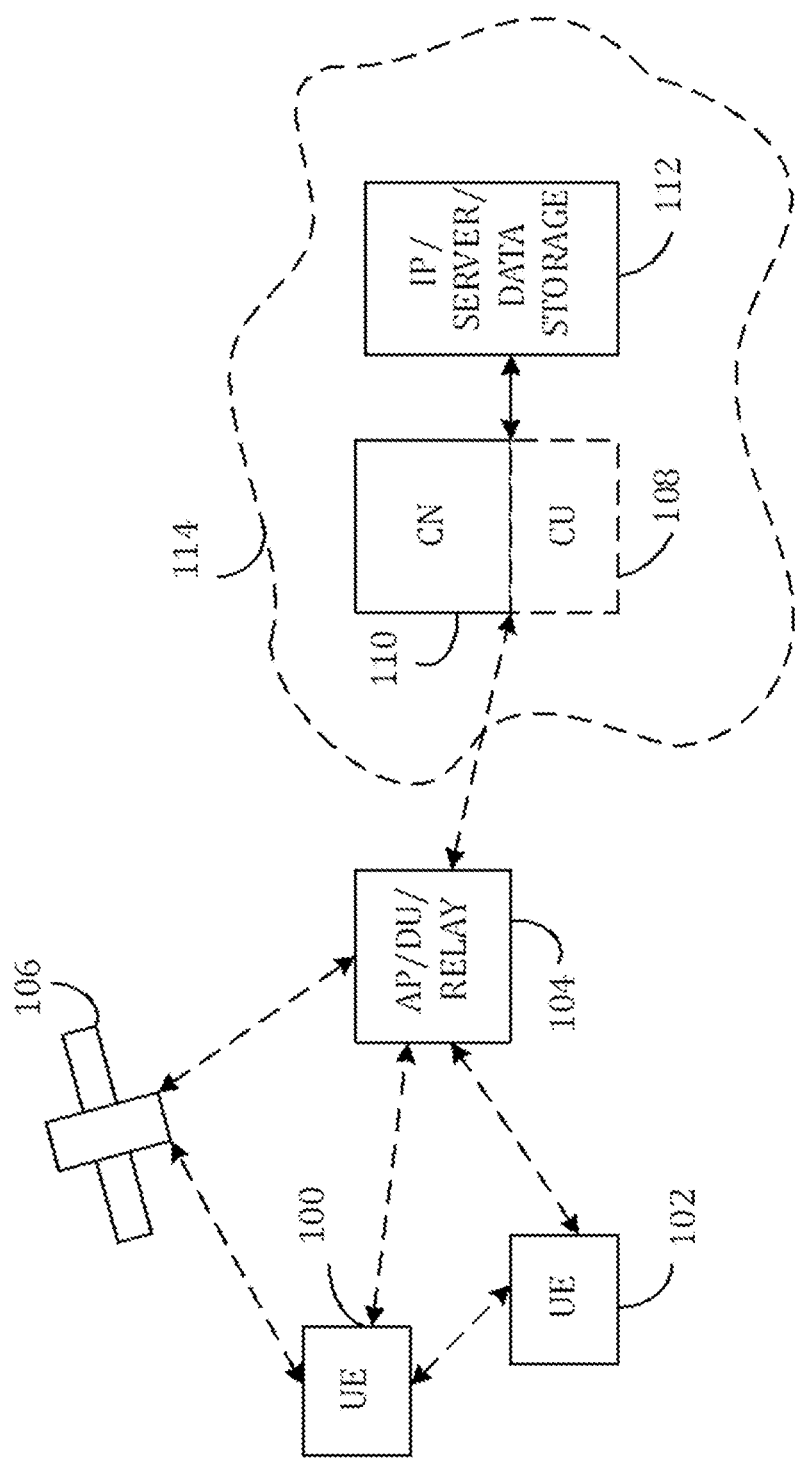

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Possible use cases comprise providing service continuity for machine-to-machine (M2M) or Internet of Things (IoT) devices or for passengers on board of vehicles, and/or ensuring service availability for critical communications, and/or future railway/maritime/aeronautical communications. Satellite communication may utilise geostationary earth orbit (GEO) satellite systems, but also low earth orbit (LEO) satellite systems, for example, mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized. HAPS may be understood as radio stations located on an object at an altitude of 20-50 kilometres and at a fixed point relative to the Earth. For example, broadband access may be delivered via HAPS using lightweight, solar-powered aircraft and airships at an altitude of 20-25 kilometres operating continually for several months for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

A non-terrestrial network may refer to a network, or a segment of networks, using radio frequency, RF, resources in a satellite or an unmanned aircraft system, UAS. The satellite or UAS may provide service, for example NR service, on Earth via one or more satellite beams and one or more cells, for example NR cells, over a given service area bounded by the field of view of the satellite. There may be a service link, i.e. a radio link, between the satellite and one or more terminal devices within the targeted service area. Furthermore, there may be a feeder link, i.e. a radio link, between the satellite and one or more satellite gateways. The satellite gateway may connect the satellite for example to a public data network. gNB functionality may be comprised for example in the satellite, the gateway, and/or in the data network may comprise access node functionalities, for example gNB functionalities. It is envisaged that non-terrestrial network, NTN, may be supported by 5G standards. For example, a 5G access node, a gNB, may be deployed on board satellites to allow coverage to areas such as those that might otherwise not be covered by a cellular communication network. This would enable 5G signals to be beamed down from space thereby enhancing the terrestrial infrastructure of a wireless communication network. It would also help to improve reliability of wireless communication during disasters such as earthquakes that may damage the terrestrial access nodes for example. It is to be noted that in some alternative embodiments the gNB may be located on ground and have a backhaul connection through the satellite.

Various types of satellites exist. For example, some satellites have been in orbit for decades and may operate 36 000 kilometres above the Earth. Some satellites are considered as Low Earth Orbit, LEO, satellites. Such satellites may operate between 500 and 2000 kilometres above the Earth. Some LEO satellites operate at approximately 600 kilometres above the Earth. A low orbit allows latency to be reduced as the satellite may be in a position that enables to quickly receive and transmit data. The footprint of a LEO satellite may be between 100-1000 km radius which may some cases allow the footprint to cover an area on Earth that includes multiple countries. It is to be noted though that as the coverage area of the LEO satellite is after all limited, a handover may be performed between two LEO satellites. The footprint provided by a satellite comprising a gNB may be an earth-fixed or an earth-moving cell. The Earth-fixed entails the satellite continuously adjusting the satellite beam pointing direction to fix the NR cell and NR beam to a specific point on earth, while the Earth-moving option entails the satellite beam pointing direction is fixed and thus the beam footprint (i.e. NR cell) is moving on Earth.

Figure 2:
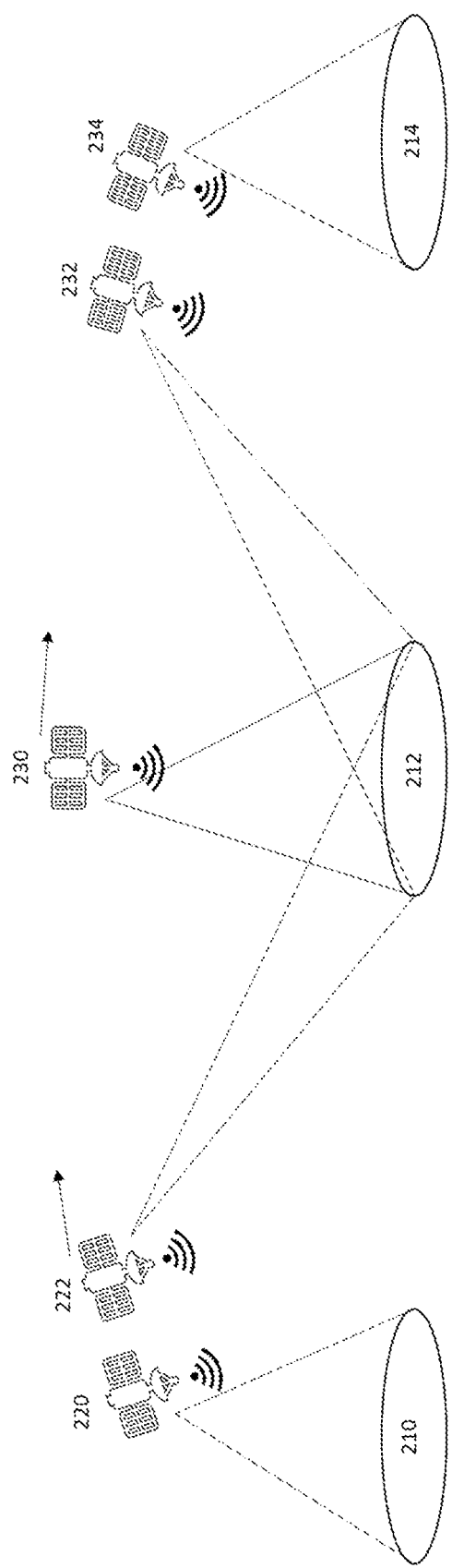
FIG. 2 illustrates an exemplary embodiment of a non-terrestrial network.

FIG. 2 illustrates an exemplary embodiment of a non-terrestrial network, NTN. In this exemplary embodiment, LEO satellites are deployed with at least one gNB and they provide Earth-fixed cells. The dashed lines illustrate a field of view of the LEO satellites. The elliptical shapes 210, 212, 214 illustrate corresponding beam footprints. The LEO satellites may utilize multiple spot beams and frequency reuse to achieve more precise beams. The coverage of such beams is smaller that the field of view of the satellite. Yet, the spot beams may enable increased throughput capabilities. One or more terminal devices, for example a mobile user device or a smart factory comprising multiple IoT devices, are to be served by a service link that provides a connection to a gNB deployed in a LEO satellite. There may be a feeder link between the LEO satellite and a gateway that provides a connection to a data network. It is to be noted that in some exemplary embodiments the gNB may be located on the Earth and have a connection to a terminal device via a satellite using a feeder link and a service link.

In FIG. 2 the fixed footprint 212 is provided by a first satellite. As the cell provided is an Earth-fixed cell, the first satellite moves at a predictable speed compared to the footprint 212. The fixed footprint 210 illustrated in FIG. 2 is provided by a second satellite. The footprint 210 is also Earth-fixed and the movement of the second satellite is also predictable as its movement speed is predictable. At time t1 the location of the first satellite is 230. At time t2 the location of the first satellite is 232 and the location of the second satellite is 220 at the time t2. After a time period dTs has passed, the location of the second satellite has moved to 222 and the location of the first satellite is 232. In other words, location of the second satellite at time t2+dTs is 222 and the location of the first satellite at time t2+dTs is 232. At time t2+dTs the first satellite provides an Earth fixed cell illustrated by the footprint 212 and the second satellite now also provides a cell with the footprint 212. Thus, at t2+dTs the first satellite and the second satellite both provide cells with the footprint 222. While cells with the footprint 222 is provided by both the first cell and the second satellite, mobility, that is radio mobility that is initiated not necessarily by the movement of one or more terminal devices, but by the movement of the access nodes, in this exemplary embodiment, the gNBs (satellites), is to be performed. The mobility, that is radio mobility due to movement of one or more access nodes in this exemplary embodiment, is then to be completed before time instant t3 that is greater than t2+dTs. At the time instant t3 the first satellite has moved to the position 234 and provides a cell with footprint 214. The movement of the satellites in an NTN with Earth-fixed cells means that as the cell is provided by different satellites at different times, the terminal devices being served by the satellite serving the cell need to perform radio mobility to the other satellite once the satellites have moved such that the satellite providing the cell changes. Yet, the movement of the satellites in this exemplary embodiment is predictable and therefore the time window for the radio mobility to be performed may be predicted. On the other hand, the number of radio mobility events to be performed during that time window may be rather high.

If a terminal device is to perform radio mobility, neighbour cell measurements may be required. For example, in a terrestrial network, a handover may be performed based on neighbour cell measurements performed by a terminal device that are reported to an access node when at least one measurement event is triggered, such as a neighbour cell getting certain dB value better than the serving cell. Similarly, for the idle terminal devices may measure neighbour cells and reselect a new serving cell when signal levels and/or quality exceeds a threshold.

In 4G access nodes, eNBs, continually transmit a Cell-specific Reference Signal, CRS. Terminal devices may then measure neighbour cells based on the CRS transmitted by an eNB. 5G on the other hand does not comprise gNBs transmitting a reference signal such as CRS. In 5G, a terminal device may measure cell quality of a neighbour cell based on SS/PBCH Blocks, SSB, transmitted by a gNB. SSB comprises synchronization signals, SS, that may be primary synchronization signal PSS and secondary synchronizations signals respectively, and a physical broadcast channel, PBCH. The SSB may be transmitted using peridiocity that is longer than that of a CRS. The SSB periodicity may be configured for each cell, for example in the range of 5, 10, 20, 40, 80, or 160 ms. However, terminal devices do not have to measure cell quality with the same periodicity as the peridiocity of the SSB. Further, an appropriate periodicity may be configured based on channel condition for example. Thus, a terminal device may be informed of a SSB-based RRM measurement timing configuration window, SMTC window, that indicates the periodicity and timing of SSBs that the terminal device may use for neighbour cell measurements. The SMTC window periodicity may be set in the same range as the SSB and the duration of the SMTC window may be set according to the number of SSBs transmitted on the cell being measured for example. In some examples, as according to 3GPP specification TS38.331 the SMTC window duration may be 1, 2, 3, 4, 5 ms while the periodicity may be 5, 10, 20, 40, 80, 160 ms. Further, even periodicities up to 320,640,1280 ms may be allowed in some exemplary embodiments.

If the duration of the SMTC window is limited that may be a challenge for NTN. In terrestrial networks delay shifts over time may be limited as they may be caused by either movement of the terminal device or asymmetrical cell geometry and thereby the location in time of the SSB of the neighbour cells relative to the serving cell time is fixed. In NTN the delay to the serving cell may change several milliseconds over the time a cell is the serving cell. Such delay may be due to the service link and feeder link propagation distances changing as the satellite moves. At the same time the timing of the neighbour cells may also change and the change may not necessarily be in the same direction. In other words, with small durations it may be challenging to identify the right timing of the measurement window such that the neighbour cell may be measured correctly by the terminal device, i.e. hit the SSB within the SMTC window. In NTN the timings of both serving cell and neighbouring cells may change constantly and thus it may be hard to specify an SMTC that would have a desired likelihood of hitting the SSBs of the neighbouring cells, while at the same time having a small duration in order to save the battery of the terminal device. Yet, in case of NTN, mobility may depend on measurements performed by terminal devices regarding the SSB of neighbouring cells. The mobility may be radio mobility comprising cell handover and/or reselection. For example, handovers and cell reselection may happen very often, such as every 6 seconds for a cell with a 50 km diameter, due to the satellites moving. Further, with Earth fixed cells, handovers for all terminal devices in the cell happen during a short duration of time. As the time of these handovers may be considered as deterministic, neighbour cell measurements may not be needed for the mobility decision until mobility is needed due to the satellite moving away from the footprint of the cell. Yet, it is to be noted that even if the timing of mobility may be predicted, the terminal device may still need to measure and synchronize to the target cell and thus SSB and SMTC timing are needed.

As it may be predicted when the neighbour cell measurements are not necessarily needed and on the other hand when those are needed, an SSB boosting may be introduced for a time period during which the SSB is needed for the neighbour cell measurements performed by terminal devices. Thus, there may be at least two periodicities for SSB transmissions of which one periodicity may be considered as a periodicity for SSB boosting. The SSB boosting may comprise using a higher frequency for transmitting SSB during SSB boost period than during other periods or using different 5G beams such that 5G beams provide the same coverage or a combination of both.

Using a higher frequency for SSB transmission during the SSB boost period requires more resources compared to non-boosted periods. Yet, resources may be required for a short duration. Further, the target cell may be considered as empty at the start of the SSB boost period, so resource usage may be acceptable. Further, in some exemplary embodiment, the frequency of the SSB may gradually be turned down as terminal devices get into the cell. If using the SSB of different 5G beams, where the 5G beams give exactly the same coverage, during the boost period for example 8 beams may be used instead of one beam in the same area thereby increasing the SSB frequency with a factor 8. It is to be noted that the timing may be distributed such the SSBs of the different beams are not send simultaneously.

In some exemplary embodiments when SSB boosting is utilized the serving cell indicates to a terminal device that SSB boosting is used in the neighbour cell and the terminal device may perform a neighbour cell measurement. Yet, if SSB boosting is not indicated, the terminal device still has a higher likelihood to hit an SSB with its normal SMTC window than without SSB boosting. However more power savings may be achieved if the SSB boosting is indicated to the terminal device. Further, in some exemplary embodiment, an indication may be provided in the Master Information Block whether the current SSB is part of a regular SSB or a "boosted SSB" in order to avoid problems with respect to initial synchronization in the system. Further, if it is indicated to the terminal device when the SSB boosting period takes place, the terminal device may save resources during the one or more other periodicities when neighbour cell measurements may not be needed.

Figure 3A:
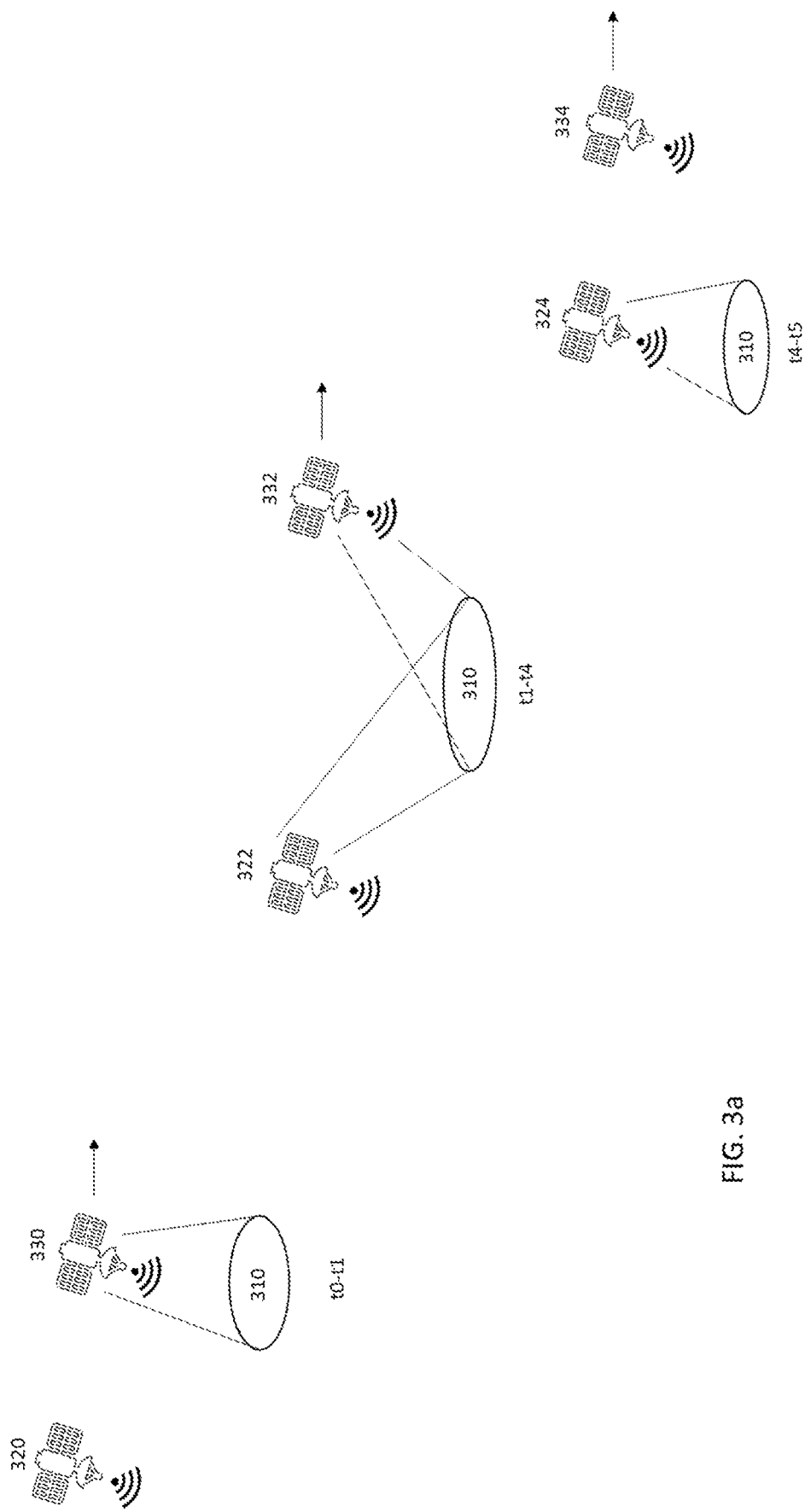
FIG. 3a illustrates an exemplary embodiment of a non-terrestrial network with an Earth-fixed cell.

FIG. 3a illustrates an exemplary embodiment of an NTN with an Earth-fixed cell that has cell coverage 310 provided by two satellites consecutively. Both satellites in this exemplary embodiment comprise a gNB. First, at time period t0-t1, the cell is provided by the first satellite. The location of the first satellite is 330. At this time period the location of the second satellite is 320. During time period t1-t4 a cell switch is taking place and cell coverage 310 is provided by the first satellite and the second satellite. The time period during which the cell coverage is provided by both the first and the second satellite may be a short period and during this period mobility is to be performed by terminal devices in the cell 310. It is to be noted that in this exemplary embodiment, mobility may be understood such that one or more terminal devices are expected to perform handover or reselection of a cell from the cell provided by the first satellite to the cell provided by the second satellite. Thus, the mobility in this exemplary embodiment is radio mobility that may be caused by the movement of the satellites comprising the gNBs or, alternatively or additionally, by movement of a terminal device which may be understood as physical movement or radio movement. The location of the first satellite during time period t1-t4 is 332 and the location of the second satellite is 322. During time period t4-t5 the cell coverage 310 is provided by the second satellite. The location of the first satellite is then 334 and the location of the second satellite is 324. At later time instants there may be a third satellite comprising a gNB approaching the cell coverage 310 and replacing the second satellite in terms of providing the cell having the cell coverage 310.

Figure 3B:
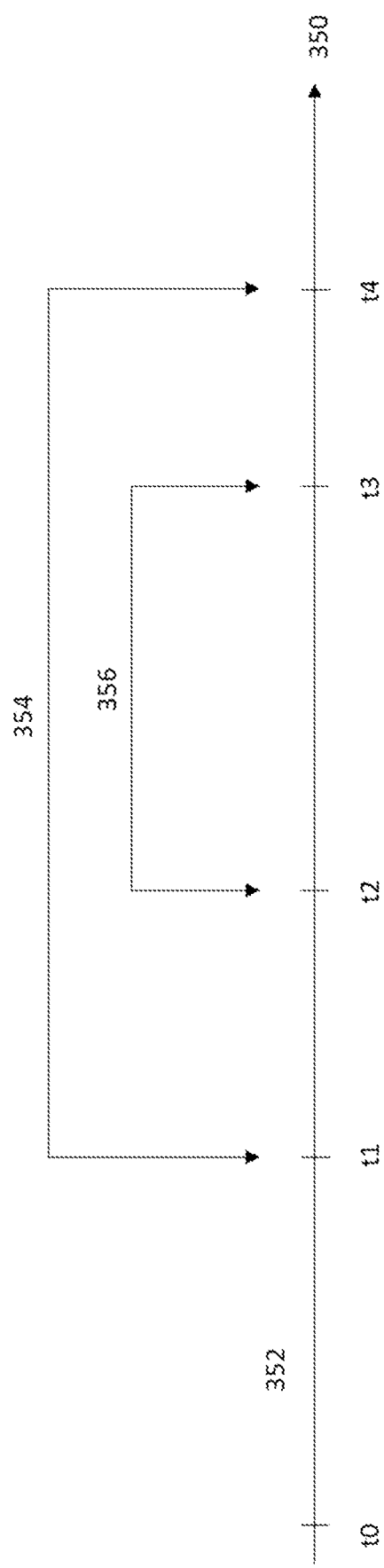
FIG. 3b illustrates an exemplary embodiment of a timing diagram for at least two SSB periodicities.

FIG. 3b illustrates a timing diagram for utilising at least two SSB periodicities in an exemplary embodiment such as the exemplary embodiment if FIG. 3a. The line 350 illustrates time. At time period 352, between time instants t0 and t1, the cell, such as cell 310, is provided by a first satellite comprising a gNB. At the time period 354, between time instants t1 and t4, radio mobility is to be performed by terminal devices served by the cell. In other words, handover is to be performed from the first satellite to the second satellite and correspondingly idle terminal devices are to reselect the cell provided by the second satellite that also comprises a gNB in this exemplary embodiment. Before and after the period 354, a first SSB periodicity is used by the gNB comprised in the second satellite and providing the target cell. This may be considered as a normal SSB periodicity as the SSB boosting is not applied. During t2 and t3, where t2 can be starting at t1 and t3 can continue until t4, the gNB comprised in the second satellite boosts its SSB frequency thereby applying a second SSB periodicity. This may be understood as SSB boosting. Boosting the SSB frequency may be understood such that the gNB comprised in the second satellite and providing the target cell transmits SSB more often than when normal SSB periodicity is used. The period 356 when neighbour cell measurements should be performed by the terminal devices may be indicated to the terminal devices for example by the gNB comprised in the first satellite. The terminal devices may further be indicated when no neighbour cell measurements are needed, for example, before t1 and after t4. The indication may be provided for example by the gNB comprised in the first satellite and/or the gNB comprised in the second satellite.

In general, an occurrence of a second time period that comprises SSB boosting may be indicated using an indication. Also, the occurrence of the first time period may be indicated. The indication may be provided by a target cell to a serving cell that may then further provide the indication to one or more terminal devices it serves. Also, in some exemplary embodiments, determining the first time period and the second time period may be based, at least partly on determining an occurrence of a cell switch state for the Earth-fixed cells provided by the first and the second gNBs. In other words, on knowledge regarding an upcoming overlap of the Earth-fixed cells.

An advantage associated with the exemplary embodiments described above may be that terminal devices may find a target cell quickly and perform the required measurements without having to specify the correct SMTC measurement window for every terminal device. Another advantage associated with the exemplary embodiments described above may be that terminal devices may save power as neighbour cell measurements may not be needed outside a specific time period.

It should be noted that although the exemplary embodiment described above are related to NTN with earth fixed cells, the concept introduced in the exemplary embodiments may be extended to similar situations in the terrestrial networks and/or in NTN with Earth moving cells as well. For example the concept may be utilized for providing coverage for high-speed trains, where the trajectory of terminal devices is predictable and thus allow for coordinated boosting of SSB transmissions when a larger set of terminal devices is departing a cell and having a new target cell. It is also to be noted that in some exemplary embodiments, the first and/or the second gNB may be partly comprised in a respective satellite. Alternatively, radio signalling of the first and/or the second gNB may be transmitted via a respective satellite.

Figure 4:
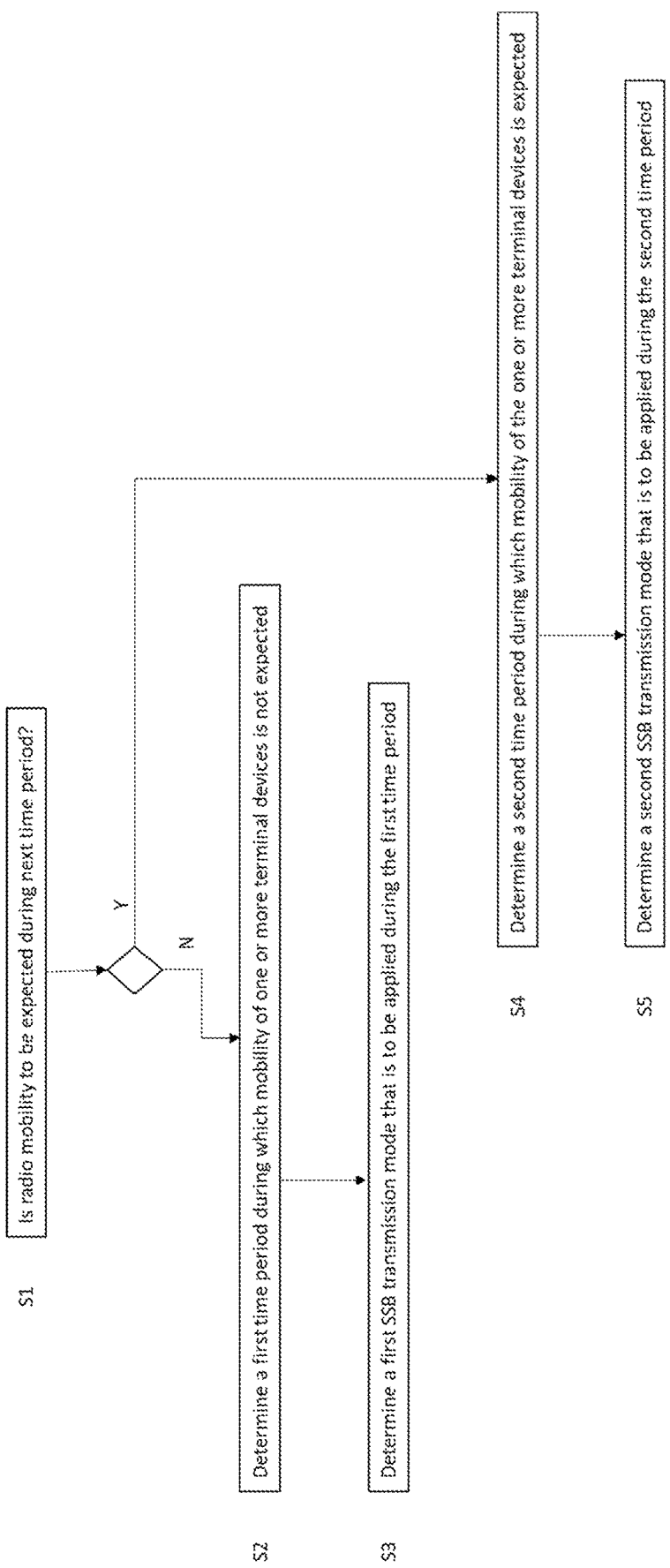
FIG. 4 and FIG. 5 illustrate flow charts according to exemplary embodiments.

FIG. 4 illustrates a flow chart according to an exemplary embodiment. In S1 it is first determined in during next time period radio mobility of one or more terminal devices is to be expected. The duration of the next time period may be determined as well or it may be pre-determined. Then, if the determination is no, in S2 a first time period during which mobility, that is in this exemplary embodiment radio mobility, of one or more terminal devices is not expected is determined. The first time period may be for example a time period such as the time period 352 of the exemplary embodiment illustrated in FIG. 3b. Then, in S3, a first SSB transmission mode that is to be applied during the first time period is determined. This may be for example a normal SSB transmitting periodicity as described above and/or using for example one 5G beam. If the determination in S1 was yes, then, in S4, a second time period during which mobility of the one or more terminal devices is expected is determined. The second time period may for example a time period such as time period 354 of the exemplary embodiment illustrated in FIG. 3b. Then, in S5, a second SSB transmission mode that is to be applied during the second time period is determined. This may be for example an SSB boosting as described above when the SSB transmission periodicity is higher than the normal periodicity and/or more 5G beams are used than in the first SSB transmission mode.

Figure 5:
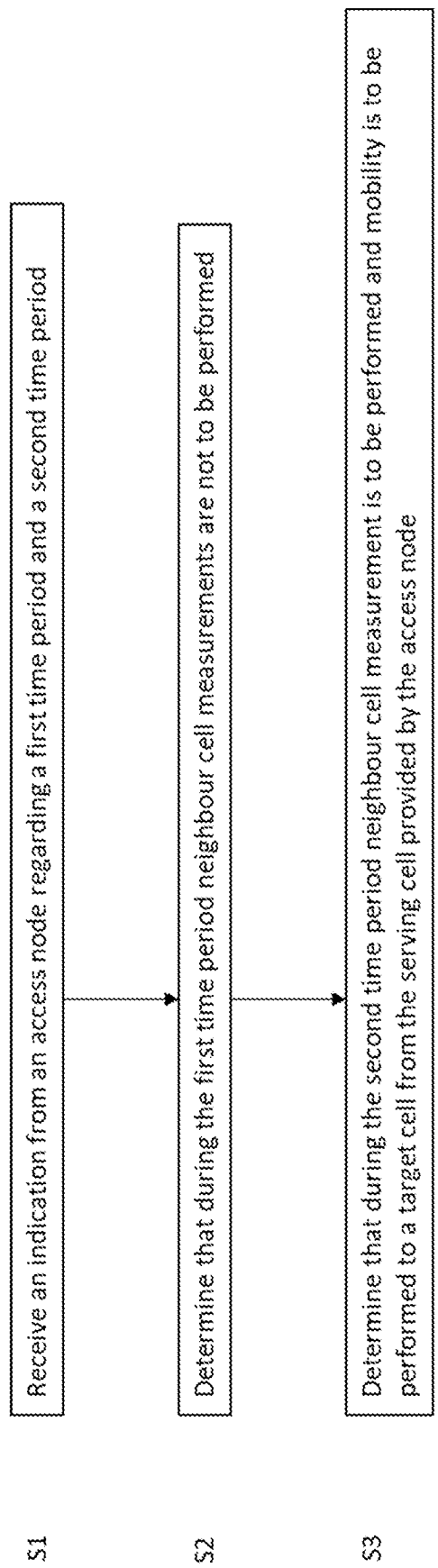

FIG. 5 illustrates a flow chart according to another exemplary embodiment. First, in S1, an indication from an access node regarding a first time period and a second time period is received. The first time period may be for example a time period such as the time period 352 and the second time period may be for example a time period such as time period 354 of the exemplary embodiment illustrated in FIG. 3b. Next, in S2, it is determined that during the first time period neighbour cell measurements are not to be performed. Next, in S3, it is determined that during the second time period neighbour cell measurement is to be performed and mobility is to be performed to a target cell from the serving cell provided by the access node.

Figure 6:
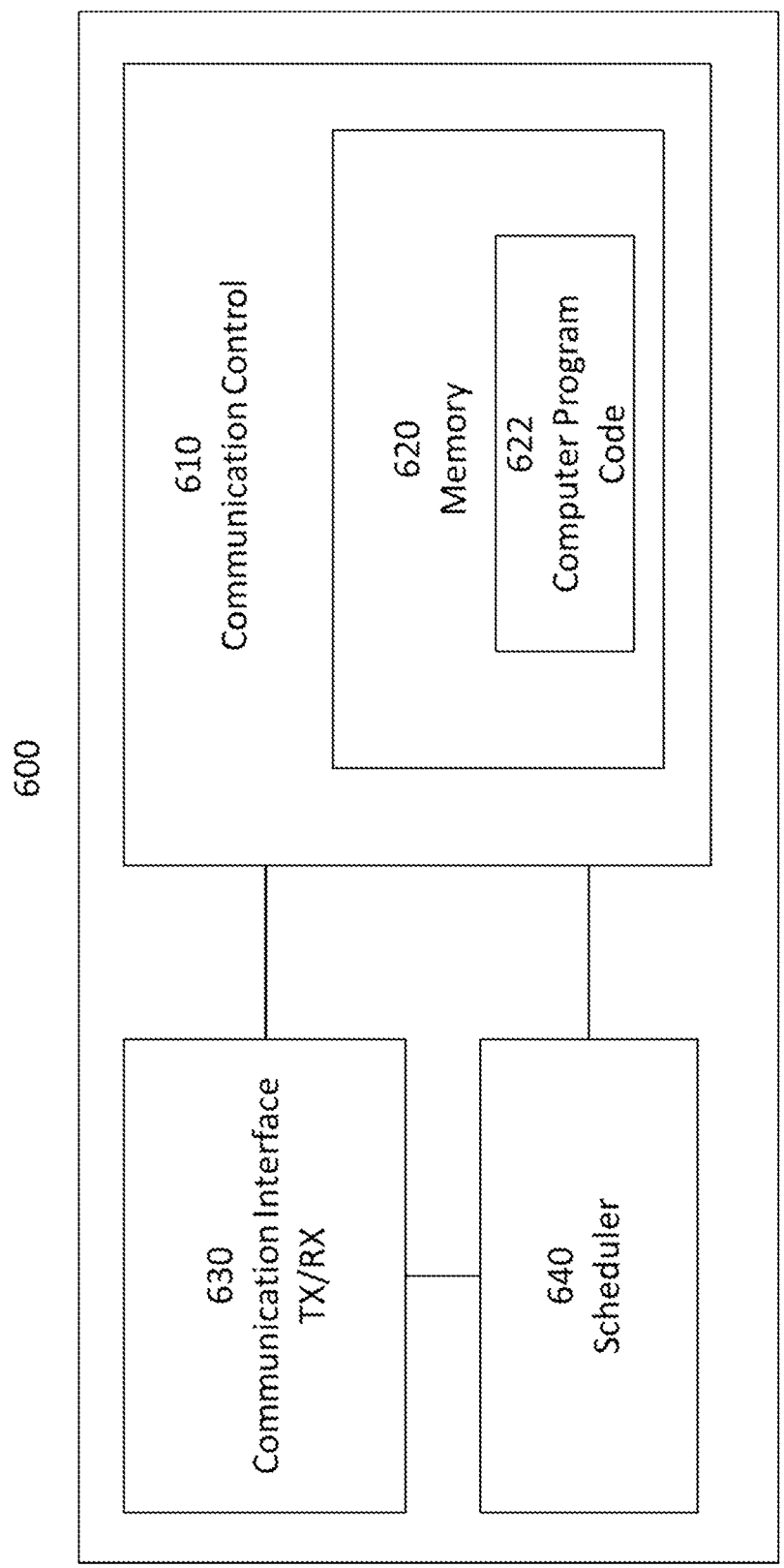
FIG. 6 and FIG. 7 illustrate exemplary embodiments of apparatuses.

The apparatus 600 of FIG. 6 illustrates an example embodiment of an apparatus that may be an access node or be comprised in an access node. The apparatus may be, for example, a circuitry or a chipset applicable to an access node to realize the described embodiments. The apparatus 600 may be an electronic device comprising one or more electronic circuitries. The apparatus 600 may comprise a communication control circuitry 610 such as at least one processor, and at least one memory 620 including a computer program code (software) 622 wherein the at least one memory and the computer program code (software) 622 are configured, with the at least one processor, to cause the apparatus 600 to carry out any one of the example embodiments of the access node described above.

The memory 620 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 600 may further comprise a communication interface 630 comprising hardware and/or software for realizing communication connectivity according to one or more communication protocols. The communication interface 630 may provide the apparatus with radio communication capabilities to communicate in the cellular communication system. The communication interface may, for example, provide a radio interface to terminal devices. The apparatus 600 may further comprise another interface towards a core network such as the network coordinator apparatus and/or to the access nodes of the cellular communication system. The apparatus 600 may further comprise a scheduler 640 that is configured to allocate resources.

Figure 7:
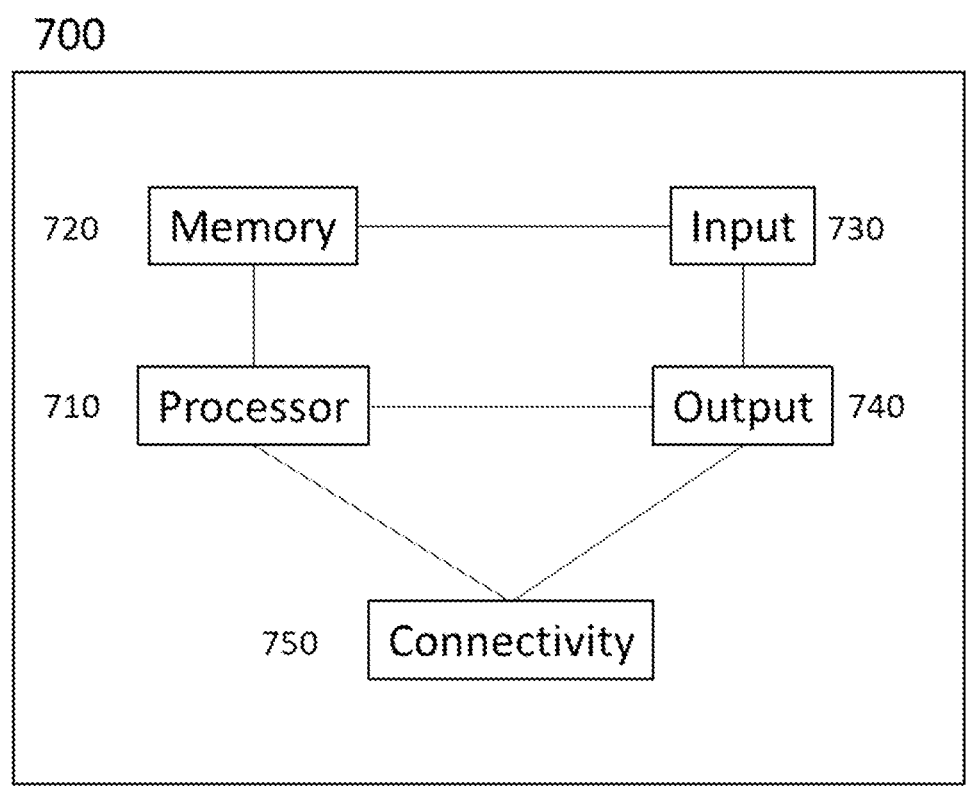

FIG. 7 illustrates an apparatus 700, which may be an apparatus such as, or comprised in, a terminal device, according to an example embodiment. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application specific integrated circuits, ASICs.

The processor 710 is coupled to a memory 720. The processor is configured to read and write data to and from the memory 720. The memory 720 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 720 stores computer readable instructions that are execute by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via electromagnetic carrier signal and/or may be copied from a physical entity such as computer program product. Execution of the computer readable instructions causes the apparatus 700 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 700 further comprises, or is connected to, an input unit 730. The input unit 730 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 730 may comprise an interface to which external devices may connect to.

The apparatus 700 also comprises an output unit 740. The output unit comprises or is connected to one or more displays capable of rendering visual content such as a light emitting diode, LED, display, a liquid crystal display, LCD and a liquid crystal on silicon, LCoS, display. The output unit 740 may comprise two displays to render stereoscopic visual content. One display to render content to the left eye and the other display to render content to the right eye. The output unit 740 may further comprise a transmission unit, such as one or more waveguides or one or more lenses, to transfer the rendered visual content to the user's field of view. The output unit 740 further comprises one or more audio outputs. The one or more audio outputs may be for example loudspeakers or a set of headphones.

The apparatus 700 may further comprise a connectivity unit 750. The connectivity unit 750 enables wired and/or wireless connectivity to external networks. The connectivity unit 750 may comprise one or more antennas and one or more receivers that may be integrated to the apparatus 700 or the apparatus 700 may be connected to. The connectivity unit 750 may comprise an integrated circuit or a set of integrated circuits that provide the wireless communication capability for the apparatus 700. Alternatively, the wireless connectivity may be a hardwired application specific integrated circuit, ASIC.

It is to be noted that the apparatus 700 may further comprise various component not illustrated in the FIG. 7. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor; and
   at least one memory including computer program code;
   the at least one memory and the computer program code configured to, with the at least one processor, cause the apparatus at least to:
   determine a first time period during which radio mobility of one or more terminal devices is not expected;
   determine a second time period during which radio mobility of the one or more terminal devices is expected, wherein radio mobility includes a handover or cell change of the one or more terminal devices;
   determine a first synchronization signal block, SSB, transmission mode for transmission of a SSB that is to be applied during the first time period; and
   determine a second synchronization signal block, SSB, transmission mode for transmission of the SSB that is to be applied during the second time period;
   wherein the first SSB transmission mode comprises a first SSB transmission periodicity and the second SSB transmission mode comprises a second SSB transmission periodicity, wherein the second SSB transmission occurs more frequently than the first SSB transmission; and
   wherein the first SSB transmission mode comprises using a first amount of 5G beams and the second SSB transmission mode comprises using a second amount of 5G beams and wherein the second amount is greater than the first amount.

2. The apparatus according to claim 1, wherein the computer program code and the at least one processor are configured to:
   change from the second transmission periodicity to the first transmission periodicity, including decreasing the frequency of the second SSB transmission gradually to the frequency of the first SSB.

3. The apparatus according to claim 1, wherein the computer program code and the at least one processor configured to cause the apparatus to determine the second time period comprises the computer program code and the at least one processor configured to determine an occurrence of a cell switch state for at least two Earth-fixed cells.

4. The apparatus according to claim 1, wherein the computer program code and the at least one processor are further configured to:
   provide an indication to an access node providing a serving cell for the one or more terminal devices, wherein the indication indicates when the second time period occurs.

5. The apparatus according to claim 1, wherein the apparatus is comprised in a gNB that is provided or comprised, at least partly, on a satellite or the gNB is on the ground with radio signals travelling through the satellite.

6. The apparatus according to claim 5, wherein the gNB provides an Earth-fixed cell.

7. An apparatus comprising:
   at least one processor; and
   at least one memory including computer program code;
   the at least one memory and the computer program code configured to, with the at least one processor, cause the apparatus at least to:
   determine a first time period during which radio mobility of one or more terminal devices is not expected;
   determine a second time period during which radio mobility of the one or more terminal devices is expected, including determine an occurrence of a cell switch state for at least two Earth-fixed cells, wherein radio mobility includes a handover or cell change of the one or more terminal devices;
   determine a first synchronization signal block, SSB, transmission mode for transmission of a SSB that is to be applied during the first time period; and
   determine a second synchronization signal block, SSB, transmission mode for transmission of the SSB that is to be applied during the second time period;
   wherein the first SSB transmission mode comprises a first SSB transmission periodicity and the second SSB transmission mode comprises a second SSB transmission periodicity, wherein the second SSB transmission occurs more frequently than the first SSB transmission.

8. The apparatus according to claim 7, wherein the computer program code and the at least one processor are configured to:
   change from the second transmission periodicity to the first transmission periodicity, including decreasing the frequency of the second SSB transmission gradually to the frequency of the first SSB.

9. The apparatus according to claim 7, wherein the first SSB transmission mode comprises using a first amount of 5G beams and the second SSB transmission mode comprises using a second amount of 5G beams and wherein the second amount is greater than the first amount.

10. The apparatus according to claim 7, wherein the computer program code and the at least one processor are further configured to:
    provide an indication to an access node providing a serving cell for the one or more terminal devices, wherein the indication indicates when the second time period occurs.

11. The apparatus according to claim 7, wherein the apparatus is comprised in a gNB that is provided or comprised, at least partly, on a satellite or the gNB is on the ground with radio signals travelling through the satellite.

12. The apparatus according to claim 11, wherein the gNB provides an Earth-fixed cell.

13. An apparatus comprising:
    at least one processor; and
    at least one memory including computer program code;
    the at least one memory and the computer program code configured to, with the at least one processor, cause the apparatus at least to:
    determine a first time period during which radio mobility of one or more terminal devices is not expected;
    determine a second time period during which radio mobility of the one or more terminal devices is expected, wherein radio mobility includes a handover or cell change of the one or more terminal devices;
    determine a first synchronization signal block, SSB, transmission mode for transmission of a SSB that is to be applied during the first time period; and
    determine a second synchronization signal block, SSB, transmission mode for transmission of the SSB that is to be applied during the second time period;
    wherein the first SSB transmission mode comprises a first SSB transmission periodicity and the second SSB transmission mode comprises a second SSB transmission periodicity, wherein the second SSB transmission occurs more frequently than the first SSB transmission;
        wherein the apparatus is comprised in a gNB that is provided or comprised, at least partly, on a satellite or the gNB is on the ground with radio signals travelling through the satellite.

14. The apparatus according to claim 13, wherein the gNB provides an Earth-fixed cell.

15. The apparatus according to claim 13, wherein the computer program code and the at least one processor are configured to:
   change from the second transmission periodicity to the first transmission periodicity, including decreasing the frequency of the second SSB transmission gradually to the frequency of the first SSB.

16. The apparatus according to claim 13, wherein the first SSB transmission mode comprises using a first amount of 5G beams and the second SSB transmission mode comprises using a second amount of 5G beams and wherein the second amount is greater than the first amount.

17. The apparatus according to claim 13, wherein the computer program code and the at least one processor configured to cause the apparatus to determine the second time period comprises the computer program code and the at least one processor configured to determine an occurrence of a cell switch state for at least two Earth-fixed cells.

18. The apparatus according to claim 13, wherein the computer program code and the at least one processor are further configured to:
   provide an indication to an access node providing a serving cell for the one or more terminal devices, wherein the indication indicates when the second time period occurs.

* * * * *